July 27, 1926.

O. T. SAUER

RADIUS ROD CLAMP

Filed Sept. 28, 1922

1,593,917

Inventor
Otto T. Sauer

By Hardway & Cathey
Attorneys

Patented July 27, 1926.

1,593,917

UNITED STATES PATENT OFFICE.

OTTO T. SAUER, OF HOUSTON, TEXAS.

RADIUS-ROD CLAMP.

Application filed September 28, 1922. Serial No. 591,056.

This invention relates to new and useful improvements in a radius rod clamp.

One object of the invention is to provide a clamp by means of which the ends of the radius rod of a motor vehicle may be securely clamped to the front axle. In some makes of automobiles, particularly the Ford automobile, the radius rods are attached at their rear ends to the case of the motor and diverge forwardly, and their forward ends are connected to the front axle near its respective ends. The securing means by which the rods are connected to the axle sometimes become loose, or the front ends of the radius rods break, and permit said rods to drop down often causing accidents. It is the object of this invention to provide a clamp by means of which said front ends may be securely held connected to the front axle.

Another object of the invention is to provide a clamp which is of cheap construction and may be easily applied to the motor vehicle, without disconnecting any of the parts of said vehicle.

With the above and other objects in view the invention has particular relation to certain novel features of construction, operation and arrangement of parts, an example of which is given in this specification and illustrated in the accompanying drawings, wherein:—

Figure 4:
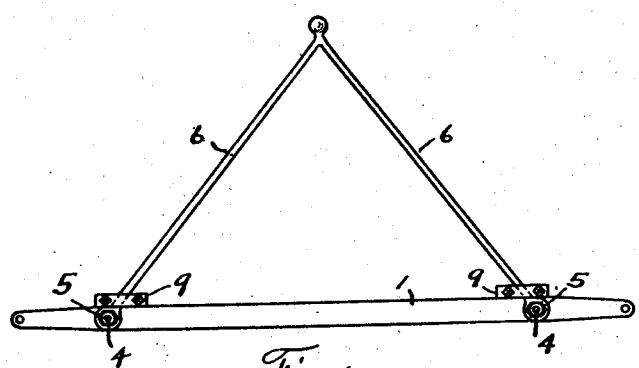

In the drawings the numeral 1 designates the front axle, and the numerals 2, 2 designate the spring perches to which the respective ends of the front spring 3 are connected. The shanks 4, 4 of these perches are fitted through vertical holes in the front axle and they are secured in place by means of the nuts 5, 5. The numerals 6, 6 designate the radius rods which may be integrally secured together at their rear ends, as shown in Figure 4. These radius rods are usually connected to the motor case and they diverge forwardly, and their forward ends are flattened and provided with holes through which the shanks 4 extend, the nuts 5 also securing the forward ends of the radius rods to the front axle.

Figure 1:
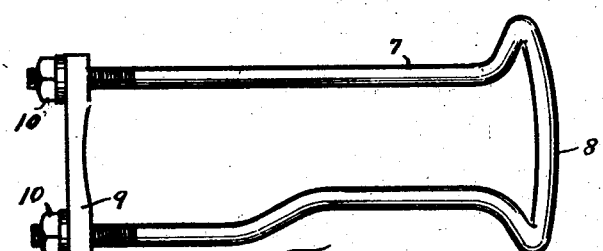
Figure 1 is a plan view of the clamp.
Figure 2:
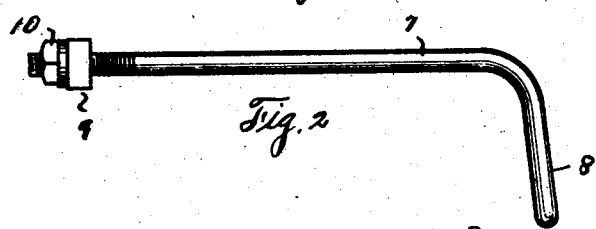
Figure 2 is a side view.
Figure 3:
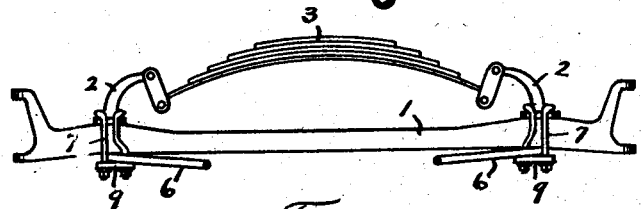
Figure 3 is a rear view of the front axle showing the clamp applied thereto and, Figure 4 is a bottom plan view of the front axle and radius rods.

In order to securely hold the front ends of the radius rods attached to the front axle I have provided a clamp which will now be described:—The clamp is preferably formed of a rod 7 bent into substantially U-shaped form, as shown in Figure 1, and whose closed end 8 is turned over at substantially right angles to the arms of the clamp. The numeral 9 designates a clamp bar whose respective ends have holes through which the free ends of said arms fit and said free ends are threaded to receive the securing nuts 10, 10.

In application the bar 9 is first detached and the U-shaped clamp member is fitted around the spring perch 2 from the front, the overturned end 8 resting on the base of the perch and the arms fitting down alongside the axle in the rear, said arms lying on opposite sides of the corresponding radius rod. The bar 9 is then fitted into place and secured by means of the nuts 10.

It is to be noted that the right arm of the left hand clamp and the left arm of the right hand clamp are curved outwardly slightly to give room for the passage of the corresponding radius rods therethrough; this is necessary for the reason that said rods lie at an oblique angle with respect to the plane of the arms of each clamp member.

It is to be noted that the upper side of the bar 9 is slightly concaved to more closely fit against the underside of the radius rod.

If for any reason the nuts 5 should become loose and drop off or the flattened front ends of the radius rods should break the clamps will still hold said radius rods in position and prevent their dropping down. However when the clamps are applied in place they will greatly lessen the liability of the breaking of said rods.

What I claim is:—

1. A radius rod clamp formed of a U-shaped member whose closed end is overturned at approximately right angles to the arms, and a detachable bar secured to the free ends of said arms.

2. A radius rod clamp formed of a U-shaped member whose closed end is overturned at substantially right angles to the arms of said member, one of said arms being bent outwardly at an intermediate point and lying substantially parallel with the other arm between said bent out portion and its free end and a bar detachably secured to the free ends of said arms.

3. A radius rod clamp formed of a substantially U-shaped member whose closed end is bent over at approximately right angles to the side arms thereof, one of said arms being curved outwardly slightly at an intermediate point and a detachable bar secured to the free ends of the arms.

4. A radius rod clamp formed of a substantially U-shaped member, a bar detachably secured to the free ends of the arms of said member one side of said bar being concaved.

5. The combination with the front axle of an automobile having a spring perch thereon and a radius rod attached thereto, of a substantially U-shaped bracket fitted around said perch and whose arms lie on opposite sides of the radius rod, and a detachable bar secured to the free ends of said arms underneath the radius rod.

6. The combination, with an axle, a spring shackle standard and bolt anchored to the axle, and a radius rod anchored to the bolt, of a yoke surrounding the standard and having rods extending on opposite sides of the radius rod, and means connecting the radius rod and the yoke rods.

7. The combination with a vehicle axle, a spring perch connected to the axle and a radius rod connected to the perch, of a substantially inverted U-shaped bolt passing around said perch and extending downwardly alongside the axle and straddling the radius rod, a plate extending beneath the radius rod, the bolt extending through said plate, and means securing the plate to said bolt.

8. The combination with a vehicle axle, a spring perch connected to the axle and a radius rod connected to the perch of a substantially inverted U-shaped bolt having a yoke-shaped head portion extending around the perch and leg portions extending downwardly from the yoke on opposite sides of the radius rod, a plate bearing against the underside of the radius rod and engaging said legs, and adjustable means for securing the plate to said legs.

9. In combination, a motor vehicle axle, a spring perch connected to said axle, a spring hanger pivotally mounted on the perch, a radius rod connected to the perch, and a clamp for additionally securing the radius rod to the axle, said clamp comprising a substantially U-shaped head engaging the perch, resting on the axle and arranged out of the path of movement of said hanger, legs integral with the U-shaped member and extending downwardly on opposite sides of the radius rods, a saddle plate bearing against the under sides of the radius rod and having apertures through which said legs pass, and nuts connecting the saddle plate to said legs.

10. A clamp for additionally securing a radius rod to the front axle of a motor vehicle, comprising a substantially U-shaped head adapted to extend about the spring perch of a motor vehicle, legs integral with the ends of the U-shaped head and arranged substantially at right angles to said head, a saddle plate arranged at the lower ends of said legs and having apertures through which the legs extend, and nuts for securing the saddle plate to said legs.

11. The combination with a front axle, the forward end of each of the radius rods, and the securing means therefor, of a clamp comprising an inverted U-shaped member having the crown portion thereof engaging the upper portion of the securing means, the arms of the inverted U-shaped members extending downwardly adjacent the front axle and having the ends thereof disposed over the opposite sides of the forward portion of each of the radius rods, a plate extending across the bottom of the forward portion of each of the radius rods and secured at its ends on the free ends of the arms of the inverted U-shaped member.

12. The combination with a front axle, the forward end of each of the radius rods, and the securing means therefor, of a clamp comprising a substantially inverted U-shaped member, the crown portion thereof extending over the upper portion of the securing means, the portion of the inverted U-shaped member adjacent the crown portion thereof being bent, the arm of the U-shaped member extending downwardly adjacent the front axle and on the opposite sides of each of the forward ends of the radius rod, the lower free ends of the arms being threaded, a plate extending across the bottom of each of the radius rods adjacent the forward end thereof, the free ends of the plates having openings therein receiving the lower ends of the arms of the inverted U-shaped member, and locking nuts threaded on the lower ends of the arms and engaging the plate.

13. In combination with the spring perch radius rod axle, connection of vehicles, auxiliary means for securing the radius rod to the axle, comprising a fastening encircling the perch and radius rod.

In testimony whereof I have signed my name to this specification.

OTTO T. SAUER.